(12) United States Patent
Chang et al.

(10) Patent No.: US 7,177,908 B1
(45) Date of Patent: Feb. 13, 2007

(54) SYSTEM AND METHOD FOR MANAGING MULTIMEDIA MESSAGING PLATFORMS

(75) Inventors: Jack H. Chang, Sunnyvale, CA (US); Raymond L. Tong, Milpitas, CA (US)

(73) Assignee: Calumet Keweenaw LLC, Los Altos, CA (US)

( * ) Notice: Subject to any disclaimer, the term of this patent is extended or adjusted under 35 U.S.C. 154(b) by 693 days.

(21) Appl. No.: 10/053,827

(22) Filed: Jan. 18, 2002

Related U.S. Application Data

(63) Continuation of application No. 08/944,668, filed on Oct. 6, 1997, now Pat. No. 6,381,633, which is a continuation-in-part of application No. 08/853,290, filed on May 9, 1997, now Pat. No. 5,974,449.

(51) Int. Cl.
*G06F 15/16* (2006.01)

(52) U.S. Cl. ........................... 709/206; 709/207

(58) Field of Classification Search ............ 709/203, 709/206, 219, 223, 236, 226, 231, 224, 225, 709/217, 202, 207, 250; 370/401, 450, 316; 705/79; 719/321; 379/126, 88, 74; 707/8, 707/10; 340/825; 726/21

See application file for complete search history.

(56) References Cited

U.S. PATENT DOCUMENTS

| | | | | |
|---|---|---|---|---|
| 4,747,126 A | * | 5/1988 | Hood et al. | 379/74 |
| 5,031,206 A | | 7/1991 | Riskin | 379/97 |
| 5,039,980 A | | 8/1991 | Aggers et al. | 340/506 |
| 5,049,873 A | * | 9/1991 | Robins et al. | 340/825.01 |
| 5,109,486 A | * | 4/1992 | Seymour | 709/224 |

(Continued)

FOREIGN PATENT DOCUMENTS

JP    403009430 A    *    1/1991

OTHER PUBLICATIONS

The Interactive Multi-directional Information Displaying System—Haruo Kimoto ; 151.100.16.20/pub/santucci/in/FADIVA/kimoto.fadiva.ps.*

(Continued)

*Primary Examiner*—Thong Vu
(74) *Attorney, Agent, or Firm*—Michael J. Donohue; Davis Wright Tremaine LLP

(57) ABSTRACT

The present invention manages a messaging network having messaging platforms interconnecting through a switched backbone such as the Internet. The master platform monitors each messaging platform on the messaging network and administers the addition, deletion, and updating of messaging platforms by modifying a master global routing table in the event the master platform encounters changes to the status of the messaging platforms. In the event that the master global routing table is updated, the global routing table held at each messaging platform is also updated, ensuring version consistency between said master global routing table and each of the global routing tables. This enables the master platform and each messaging platform to determine the operational status of another messaging platform. The present invention may also provide a cost tracking scheme when delivering messages between messaging platforms that are owned by different entities. This avoids use agreements between messaging platform owners and owners of networks which are connected to the messaging platforms. The cost for each network message delivery is measured in tokens. The present invention may also include a post office function that enables a master platform to receive and store a status message destined for a messaging platform which does not have an active connection to the messaging network or is in a non-operational state. The present invention may also include an information delivery service that delivers a message from at least one source outside of the messaging network to a subscriber via the subscriber's messaging platform regardless of whether the messaging platform has a dedicated or dial-up connection.

44 Claims, 8 Drawing Sheets

U.S. PATENT DOCUMENTS

| | | | |
|---|---|---|---|
| 5,115,362 A | 5/1992 | Harada et al. | 360/92 |
| 5,333,266 A | 7/1994 | Boaz et al. | 395/200 |
| 5,349,636 A | 9/1994 | Irribarren | 379/89 |
| 5,377,191 A | 12/1994 | Farell et al. | 370/94.1 |
| 5,479,411 A | 12/1995 | Klein | 370/110.1 |
| 5,517,556 A * | 5/1996 | Pounds et al. | 379/88.25 |
| 5,530,740 A | 6/1996 | Irribarren et al. | 379/89 |
| 5,557,539 A | 9/1996 | Fitch | 709/206 |
| 5,557,659 A | 9/1996 | Hyde-Thomson | 379/88 |
| 5,577,202 A | 11/1996 | Padgett | 709/206 |
| 5,581,749 A * | 12/1996 | Hossain et al. | 707/10 |
| 5,608,643 A | 3/1997 | Wichter et al. | 364/479.14 |
| 5,608,786 A | 3/1997 | Gordon | 379/100 |
| 5,621,727 A * | 4/1997 | Vaudreuil | 370/401 |
| 5,633,916 A | 5/1997 | Goldhagen et al. | 379/67 |
| 5,647,002 A | 7/1997 | Brunson | 380/49 |
| 5,661,516 A | 8/1997 | Carles | 348/8 |
| 5,675,507 A | 10/1997 | Bobo, II | 364/514 R |
| 5,680,443 A * | 10/1997 | Kasday et al. | 379/88.13 |
| 5,689,550 A * | 11/1997 | Garson et al. | 379/88.18 |
| 5,691,980 A * | 11/1997 | Welles et al. | 370/316 |
| 5,708,699 A * | 1/1998 | Concepcion et al. | 379/88.19 |
| 5,715,393 A | 2/1998 | Naugle | 709/224 |
| 5,727,156 A | 3/1998 | Herr-Hoyman et al. | 709/219 |
| 5,734,820 A * | 3/1998 | Howard et al. | 726/21 |
| 5,734,828 A * | 3/1998 | Pendse et al. | 709/203 |
| 5,737,395 A | 4/1998 | Irribean | 379/88 |
| 5,740,231 A | 4/1998 | Cohen et al. | 379/89 |
| 5,740,362 A | 4/1998 | Buickel et al. | 709/200 |
| 5,745,689 A | 4/1998 | Yeager | 395/200.36 |
| 5,751,960 A | 5/1998 | Matsunaga | 395/200.36 |
| 5,754,306 A | 5/1998 | Taylor et al. | 358/400 |
| 5,786,770 A | 7/1998 | Thompson | 340/825.06 |
| 5,790,793 A | 8/1998 | Higley | 709/218 |
| 5,793,763 A | 8/1998 | Mayes et al. | 370/389 |
| 5,794,039 A | 8/1998 | Guck | 395/683 |
| 5,805,203 A | 9/1998 | Horton | 348/12 |
| 5,809,237 A | 9/1998 | Watts et al. | 709/202 |
| 5,812,668 A * | 9/1998 | Weber | 705/79 |
| 5,812,773 A | 9/1998 | Norin | 709/204 |
| 5,812,795 A | 9/1998 | Horovitz et al. | 395/200.75 |
| 5,813,009 A | 9/1998 | Johnson et al. | 707/100 |
| 5,822,526 A * | 10/1998 | Waskiewicz | 709/206 |
| 5,828,842 A | 10/1998 | Sugauchi et al. | 709/223 |
| 5,828,888 A | 10/1998 | Kozaki et al. | 395/712 |
| 5,835,743 A | 11/1998 | Zucker | 395/376 |
| 5,838,458 A | 11/1998 | Tsai | 358/402 |
| 5,838,923 A | 11/1998 | Lee et al. | 709/236 |
| 5,841,978 A * | 11/1998 | Rhoads | 709/217 |
| 5,870,556 A * | 2/1999 | Cote et al. | 709/224 |
| 5,881,292 A | 3/1999 | Sigal et al. | 395/712 |
| 5,903,726 A | 5/1999 | Donovan et al. | 709/206 |
| 5,918,018 A * | 6/1999 | Gooderum et al. | 709/225 |
| 5,925,101 A * | 7/1999 | Bayless et al. | 709/219 |
| 5,925,137 A | 7/1999 | Okanoue et al. | 714/4 |
| 5,926,463 A | 7/1999 | Ahearn et al. | 370/254 |
| 5,930,471 A | 7/1999 | Milewski et al. | 709/204 |
| 5,931,909 A | 8/1999 | Taylor | 709/221 |
| 5,974,122 A | 10/1999 | Nelson et al. | 345/331 |
| 5,974,449 A * | 10/1999 | Chang et al. | 709/206 |
| 5,978,840 A | 11/1999 | Nguyen et al. | 709/217 |
| 5,982,780 A * | 11/1999 | Bohm et al. | 370/450 |
| 5,999,930 A * | 12/1999 | Wolff | 707/8 |
| 6,014,644 A | 1/2000 | Erickson | 705/37 |
| 6,031,978 A | 2/2000 | Cotner et al. | 709/248 |
| 6,047,323 A | 4/2000 | Krause | 709/227 |
| 6,065,047 A | 5/2000 | Carpenter et al. | 709/218 |
| 6,070,196 A * | 5/2000 | Mullen, Jr. | 709/250 |
| 6,118,791 A | 9/2000 | Fichou et al. | 370/468 |
| 6,138,153 A | 10/2000 | Collins, III et al. | 709/221 |
| 6,275,869 B1 * | 8/2001 | Sieffert et al. | 719/321 |
| 6,286,036 B1 * | 9/2001 | Rhoads | 709/217 |
| 6,298,126 B1 * | 10/2001 | Kawecki et al. | 379/126 |
| 6,311,214 B1 * | 10/2001 | Rhoads | 709/217 |
| 6,363,411 B1 * | 3/2002 | Dugan et al. | 709/202 |
| 6,381,633 B2 * | 4/2002 | Chang et al. | 709/206 |
| 6,535,910 B1 * | 3/2003 | Suzuki et al. | 709/207 |

FOREIGN PATENT DOCUMENTS

JP     404077873 A  *  3/1992

OTHER PUBLICATIONS

Multimedia Authoring Tools: State of the Art and Research . . . - Bulterman, Hardman (1995) ; www.cwi.nl/ftp/mmpapers/Incs.1000.ps.gz.*

Exchanging Multimedia Mail Message in MIME—Tsoi, Rahman (1996) ; www.egd.igd.fhg.de/events/egmm96/paper5.ps.*

A C++ Data Model Supporting Reachability Analysis and . . . — Chen, Gansner.. (1998) www.research.att.com/~acacia/doc/acacia-esec97.ps.gz.*

Fine-Grained Sharing in a Page Server OODBMS—Carey, Franklin, Zaharioudakis (1994) ftp.cs.wisc.edu/tech-reports/reports/94/tr1224.ps.Z.*

A Method for Generating Random Circuits and its Application to . . . —Damauer, Dai (1996) www.cse.ucsc.edu/research/fpmcm/fpga96.ps.*

Placement and Routing Tools for the Triptych FPGA—Carl Ebeling (1995) www.ece.nwu.edu/~hauck/publications/TripTools.ps.*

Performance-Driven Interconnect Design Based on Distributed . . . —Cong, Leung, Zhou (1993) cadlab.cs.ucla.edu/~ksleung/paper/csd920043.ps.*

Traffic Shaping for Congestion Control in High Speed ATM Networks—Liu (1992) ftp.cs.usask.ca/pub/discus/thesis-liu.ps.Z.*

@INGate: a distributed intelligent network approach to bridge switching and packet networks Simeonov, P.L.; Hofmann, P.; Rebenburg, M.; Ruffer, D.; Computer Communications and Networks, 1997. Proceedings., Sixth International Conference on Sep. 22-25, 1997 pp. 358-363.*

A distributed fax messaging system; Hui, S.C.; Chan, K.Y.; Leung, M.K.; Qian, G.Y.; Networks, 1995. Theme: 'Electrotechnology 2000: Communications and Networks'. [in conjunction with the] International Conference on Information Engineering., Proceedings of IEEE Singapore International Conference on Jul. 3-7, 1995 pp. 393-397.*

Bellcore, "Simplified Message Desk Interface (SMDI) Generic Requirements", Technical Reference TR-NWT-000283, Issue 2, May 1991, pp. 1-22.

Service Communication Platform, Release 2.0, "Functional Requirements Specification" Rev. 1.02, Jun. 10, 1997, chapter 1-5.

Dialogic Voice Products, "D/42-NS™ Switch Integration Board", pp. 1-7

Dialogic, "D/82JCT-U Revolutionary PBX Integration Platform" Apr. 25, 2000, pp. 1-4, http://www.dialogic.com/products/d_sheets/6040web.htm.

Lucent Technologies, "Versatile Remote Mailbox Management Software for Octel Message Servers" Apr. 22, 2000, pp. 1-3, http:www.octel.com/enterprises/unifiedmessaging/ww.../index.htm.

Nortel Networks, "Norstar Voice Mail Requirements", Apr. 22, 2000, pp. 1-2, http://www.nortelnetworks.com/products/01/norstar.../messaging.htm.

Nortet Networks, "Desktop Messaging: The Power of Information Access", Apr. 22, 2000, pp. 1-2, http://www.nortelnetworks.com/products/0../desktop_messaging.htm.

Dialogic, "Taking Advantage of PBX Switch Integration in Computer Telephony Application", Jan. 1996, pp. 1-11.

Dialogic, "Dialogic Launches Industry's First Combined PBX Integration and Multimedia Platform", Apr. 25, 2000, pp. 1-3, http://www.dialogic.com/emea/press/300-combpbx.htm.

Dialogic, "PBXpert/32", pp. 1-3.

Dialogic, "DM3 IPLink DM/IP040-LSI" pp. 1-3.

Dialogic, "Become an Expert at PBX Integration", Apr. 25, 2000, pp. 1-3, http://www.dialogic.com/products/3732web.htm.

Dialogic, "Voice Mail", Apr. 25, 2000, pp. 1-5, http://www.dialogic.com/company/aboutct/ctapps/1804web.htm.

Dialogic, "IP Technology Basics", Apr. 25, 2000, pp. 1-9, http://www.dialogic.com/solution/internet/4070web.htm.

Dialogic, "D/41ESC, Global SCSA 4-Port Voice Processing Board", pp. 1-8.

Dialogic, "Enabling Unified Messaging, Unified Messaging with Dialogic Components Tames Communication Chaos", Apr. 25, 2000, pp. 1-15, http://www.dialogic.com/company/whitepap/5047web.htm.

* cited by examiner

| | | 82 | | 86 | | | 88 | | |
|---|---|---|---|---|---|---|---|---|---|
| Entry 1 | Host ID (84) | | Daily operation period | Hourly operation Duration | Permanent IP Address | Local network routing table | Token Pool Amount | Operation Status |
| | 90 | Domain Name | | | | | | | |
| | 92 | Name Recording File | | | | | | | |
| | | Address (94) | | (96) | (98) | (87) | (100) | (89) | (85) |
| Entry 2 | Host ID | | Daily operation period | Hourly operation Duration | Permanent IP Address | Local network routing table | Token Pool Amount | Operation Status |
| | Domain Name | | | | | | | |
| | Name Recording File | | | | | | | |
| | Address | | | | | | | |
| Entry N | Host ID | | Daily operation period | Hourly operation Duration | Permanent IP Address | Local network routing table | Token Pool Amount | Operation Status |
| | Domain Name | | | | | | | |
| | Name Recording File | | | | | | | |
| | Address | | | | | | | |

FIG. 2A

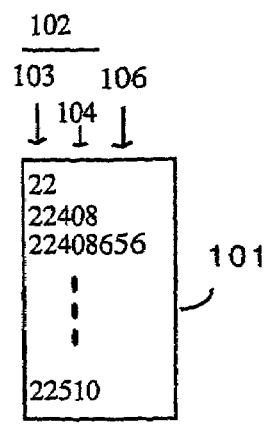

FIG. 2B

SYSTEM AND METHOD FOR MANAGING MULTIMEDIA MESSAGING PLATFORMS

CROSS REFERENCES TO RELATED APPLICATIONS

This application is a CON of Ser. No. 08/944,668 Oct. 6, 1997 U.S. Pat. No. 6,381,633 which is a CIP of Ser. No. 08/853,290 May 9, 1997 U.S. Pat. No. 5,974,449.

BACKGROUND OF THE INVENTION

1. Field of the Invention

This invention relates to the management of messaging platforms that are interconnected to form a wide-area network.

2. Background

A messaging system as shown in U.S. Pat. No. 5,568,540 to Greco et. al., enables a user to receive messages having a voice mail format either through a telephone or through a personal computer ("PC") coupled to a local area network (LAN). It also provides a graphical user interface ("GUI") on the PC to select which voice mail messages to receive and in what order. However, the messaging system in Greco is a stand-alone system and thus, does not provide the advantages of linking to other similar messaging systems or of using interconnected messaging systems to provide distributed messaging.

Accordingly, it would be desirable to integrate messaging platforms distributed on a switchable communications backbone such as the Internet, or equivalent network such as a wide area corporate intranet, and connected to different area networks so as to provide global yet low cost messaging.

Moreover, it would be desirable to monitor each messaging platform and administer the addition, deletion, and updating of a messaging platform in response to a status change to the messaging platform so that each messaging platform is aware of the status change.

In addition, it would be desirable to minimize the complexity that would result if every independent owner of a messaging platform had to contract with every other independent owner of a messaging platform in order to deliver a message within a certain service area served by a messaging platform by imposing a cost tracking scheme on each messaging platform that uses the switched backbone to send a message to another messaging platform for delivery to the service area.

Furthermore, it would be desirable to provide a feature that manages a status message destined for a messaging platform which does not have an active connection to the switched backbone so that the status message is promptly delivered to the messaging platform the next time it re-establishes a connection to the switched network and results in a message confirming delivery of the status message to the messaging platform.

Last, it would be desirable to include an information delivery service that delivers a message from at least one source outside of the messaging network to a subscriber via the subscriber's messaging platform regardless of whether the messaging platform has a dedicated or dial-up connection.

SUMMARY OF THE INVENTION

The present invention manages a messaging network having messaging platforms interconnecting through a switched backbone such as the Internet. Each messaging platform may be independently owned and may also connect to local networks that may be independently owned. A master platform maintains a master global routing table having a messaging platform profile for every messaging platform established on the messaging network. Each messaging platform holds a global routing table which includes a current version of the master global routing table. The master platform monitors each messaging platform on the messaging network and administers the addition, deletion, and updating of messaging platforms by modifying its master global routing table in the event the master platform encounters changes to the status of the messaging platforms. In the event that the master global routing table is updated, the global routing table held by each messaging platform is also updated, ensuring version consistency between the master global routing table and each of the global routing tables. This enables the master platform and each messaging platform to determine the operational status of another messaging platform.

Also, since the messaging platforms may be independently owned and are designed to receive and deliver messages through a variety of networks that may impose surcharges, the present invention also provides a cost tracking feature when delivering messages between messaging platforms that are owned by different entities. This avoids the need for use agreements between messaging platform owners and owners of networks which are connected to the messaging platforms. The cost for each network message delivery is measured in tokens. Each messaging platform on the messaging network has a token pool. Each owner of a messaging platform is charged for the cost of the tokens. Each time a network message delivery is initiated, the originating messaging platform debits a selected number of tokens from its token pool, while each time an inbound network message delivery occurs, a selected number of tokens are credited to the token pool held by a target messaging platform.

The present invention also includes a post office function that enables a master platform to receive and store a status message destined for a messaging platform which does not have an active connection to the messaging network or is in a non-operational state. The present invention also includes an information delivery service that delivers a message from at least one source outside of the messaging network to a subscriber via the subscriber's messaging platform regardless of whether the messaging platform has a dedicated or dial-up connection.

BRIEF DESCRIPTION OF THE DRAWINGS

FIG. 2A is a block diagram of a global routing table in accordance with a preferred embodiment of the present invention.

FIG. 2B is a block diagram of a local area routing table in accordance with a preferred embodiment of the present invention.

DETAILED DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using circuitry in a microprocessor adapted to the particular process steps and data structures, and that implementation of the process steps and data structures described herein would not require undue experimentation or further invention.

The present invention may be used with co-pending U.S. patent application Ser. No. 08/853,290 filed May 9, 1997, entitled, "APPARATUS AND METHOD FOR PROVIDING MULTIMEDIA MESSAGING BETWEEN DISPARATE MESSAGING PLATFORMS," hereinafter referred to as the ("multimedia messaging invention"). The complete disclosure of the foregoing patent application is hereby incorporated herein by reference as if set forth fully herein.

To further enhance the description of the various features of the present invention, "Service Communication Platform," Release 2.0, available from Carmel Connection, Inc. located at 41432 Christy Street, Fremont, Calif., 94538 is also incorporated herein by reference as if set forth fully herein.

Figure 1:
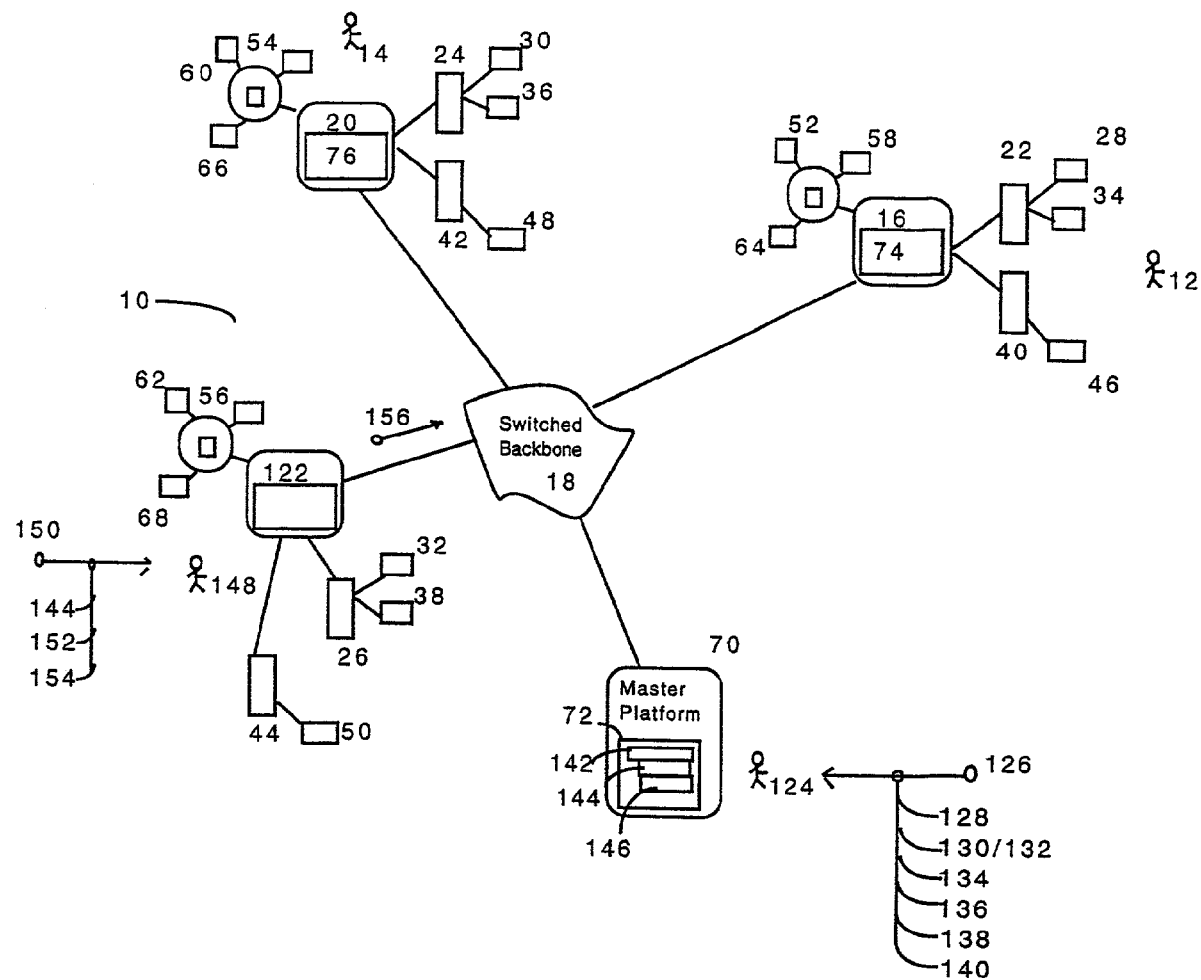
FIG. 1 is a schematic block diagram of a messaging management system in a presently preferred embodiment of the present invention.

FIG. 1 is a schematic block diagram of a messaging management system in a presently preferred embodiment of the present invention.

As seen in FIG. 1, a messaging network 10 enables a user 12 to send or receive a message to or from another user 14 using the multimedia services provided by a messaging platform 16 connected to messaging network 10. Messaging network 10 uses a switched backbone 18 such as the Internet, enabling messaging platform 16 to send or receive multimedia messages with another messaging platform on messaging network 10 such as remote messaging platform 20. This provides global messaging at very low cost.

Besides the switched backbone 18, each messaging platform may also individually connect to local networks such as a public switch telephone network 22, 24, 26 (PSTN) which may be connected to messaging devices such as telephones 28, 30, 32 and/or fax machines 34, 36, 38; a private branch exchange 40, 42, 44 (PBX) which may also connect to a messaging device such as a telephone 46, 48, 50; or a privately administered LAN and/or WAN 52, 54, 56 which may connect to messaging devices that include a computer terminal 58, 60, 62 or personal computer 64, 66, 68 running a browser program. These networks may be owned and operated by an owner who may or may not be affiliated with an owner of a messaging platform.

The present invention manages messaging network 10 by monitoring the current availability of each existing messaging platform and administering the addition, deletion, and updating of messaging platforms on messaging network 10. The master platforms and messaging platforms described herewith contain a programmable control means such as a microprocessor system running under program control or an equivalent device to perform these functions.

Also, since the messaging platforms may be independently owned and are designed to receive and deliver messages through a variety of networks that may impose surcharges, the present invention provides a cost tracking scheme when delivering messages between messaging platforms that are owned by different entities. This avoids the need for complex use agreements between messaging platform owners and owners of networks which are connected to the messaging platforms.

In accordance with a presently preferred embodiment of the present invention, the messaging platforms on messaging network 10 are managed by at least one master platform 70. Every master platform on the messaging network 10 contain a master global routing table and every messaging platform on the messaging network contains a global routing table. Master platform 70 maintains a master global routing table 72 for an assigned group of messaging platforms, such as messaging platforms 16 and 20, by editing a messaging platform entry within master global routing table 72 that corresponds to a messaging platform having a status change. Master platform 70 maintains content consistency, through a microprocessor system running under program control or an equivalent device, between master global routing table 72 and global routing tables 74 and 76 so that master platform 70 and messaging platforms 16 and 20 each rely on the same messaging platform entries within the global routing tables.

In response to an applicable event such as the status change discussed above, master platform 70 sends an UPDATE message to messaging platforms 16 and 20, enabling messaging platforms 16 and 20 to update their global routing tables 74 and 76 through a microprocessor system running under program control or an equivalent device. As presently contemplated, the UPDATE message includes at least one messaging platform entry that was modified by master platform 70. The messaging platform entry is used by messaging platforms 16 and 20 to update a corresponding entry in their global routing tables 74 and 76, respectively.

FIG. 2A is a block diagram of a global routing table in accordance with a preferred embodiment of the present invention.

A global routing table 80 as used in the present invention contains a corresponding messaging platform entry 82 for each messaging platform on messaging network 10. Each messaging platform entry includes fields that may point to or include the following: a host ID 84; an operational status 85; an operation schedule 86; a permanent Internet Protocol (IP) address 87 (if applicable); an area of operation 88, and a token pool 89.

Host ID 84 is a unique identifier for every messaging platform added to the messaging network. Host ID 84 may further include additional identifiers such as a domain name 90; a name recording file 92; and/or a network address or equivalent 94.

Operational status 85 defines the operational state of a messaging platform as determined by the master platform assigned to the messaging platform. It is presently contemplated that operational status 85 has either an in-operation (ACTIVATED) or a non-operational (DEACTIVATED) state. Changing the state of operation status 85 is further discussed below.

Operation schedule 86 defines the operation window for a messaging platform. Operation schedule 86 includes a daily operation period 96 and an hourly operation period 98. Daily operation period 96 has a format that includes a start time and an end time in units of hours that are separated by a dash. For example, a daily operation period that starts from 8 AM and ends at 6 PM would be indicated as "08–18." Similarly, a round-the-clock operation would be indicated as "00–23."

Hourly operation period 98 defines the hourly operation window for a messaging platform. Hourly operation period 98 has a format that includes a start time and an end time in units of minutes that are separated by a dash. For example, an hourly operation period 98 that starts every fifteen minutes beyond the hour and ends at every half-hour would be indicated as "15–30," while full hourly operation would be indicated as "00–59."

Domain name 90 defines a unique network name for messaging platform that corresponds to the messaging platform entry. For a messaging platform that uses the Internet as its switched backbone, domain name 90 corresponds to a TCP/IP network address and complies with the convention for naming a host node, such as a messaging platform, on the Internet.

In the event that the messaging platform entry corresponds to a messaging platform having a dedicated connection to the switched backbone, permanent IP address field 87 contains a permanent IP address or similar network address.

Area of operation 88 may be defined using a local network routing table 100, which is a variable length table but could have any format that is suitable for storing a variable amount of information. The type of information held by local network routing table 100 is dependent on the type of local network connection that a particular messaging platform is capable of supporting besides a messaging network connection. When a messaging platform is configured to also support a telephone network, a local network routing table that corresponds to that messaging platform through its messaging platform entry would include a list of telephone number prefix digits. The telephone numbers listed in local network routing table 100 enable an originating messaging platform to determine which messaging platform can provide service to those telephone numbers by cross-referencing a destination telephone number with the messaging platform entries in the originating platform's global routing table.

Token pool 89 has an initial value that may vary according to the amount sought by an owner of each new messaging platform added. The use of token pool 89 in the present invention will be further described below.

FIG. 2B shows a local network routing table 101 having prefix digits 102 which correspond to a list of telephone numbers. As presently contemplated, prefix digits 102 may include a country code 103 and area code 104, or may further include an office digit code 106 to further define the range of numbers that can be called.

Local network routing table 101 enables an originating messaging platform to determine which remote messaging platform is capable of delivering a user message at an area of operation. The originating messaging platform cross-references the user message address, which may be in the form of a telephone number, with every local network routing table contained in the messaging platform's global routing table.

For example, a fax originating from an originating messaging platform in Hong Kong may have a fax destination number having a country code of "1" and an area code of "510". The originating platform cross-references the fax number with its local network routing table to determine which remote messaging platform on the messaging network can service that country and area code. More specifically, originating messaging platform can then determine which messaging platform entry to use in order to obtain delivery information such as the domain name of the remote messaging platform and its hours of operation.

Returning to FIG. 2A, name recording file 92 contains a voice recording of the name of a messaging platform. Name recording file 92 may be in any suitable digitized file format such as a .WAV file or similar digitized audio file format.

Network address field 94 holds a permanent IP address, or an equivalent type of network address that is applicable to the type of switched backbone used, of a messaging platform if the messaging platform has a permanent connection to the messaging network. Otherwise, network address field contains an indication that the messaging platform corresponding to the messaging platform entry is configured for dial-up connection to the messaging network.

Adding Messaging Platforms

Figure 3:
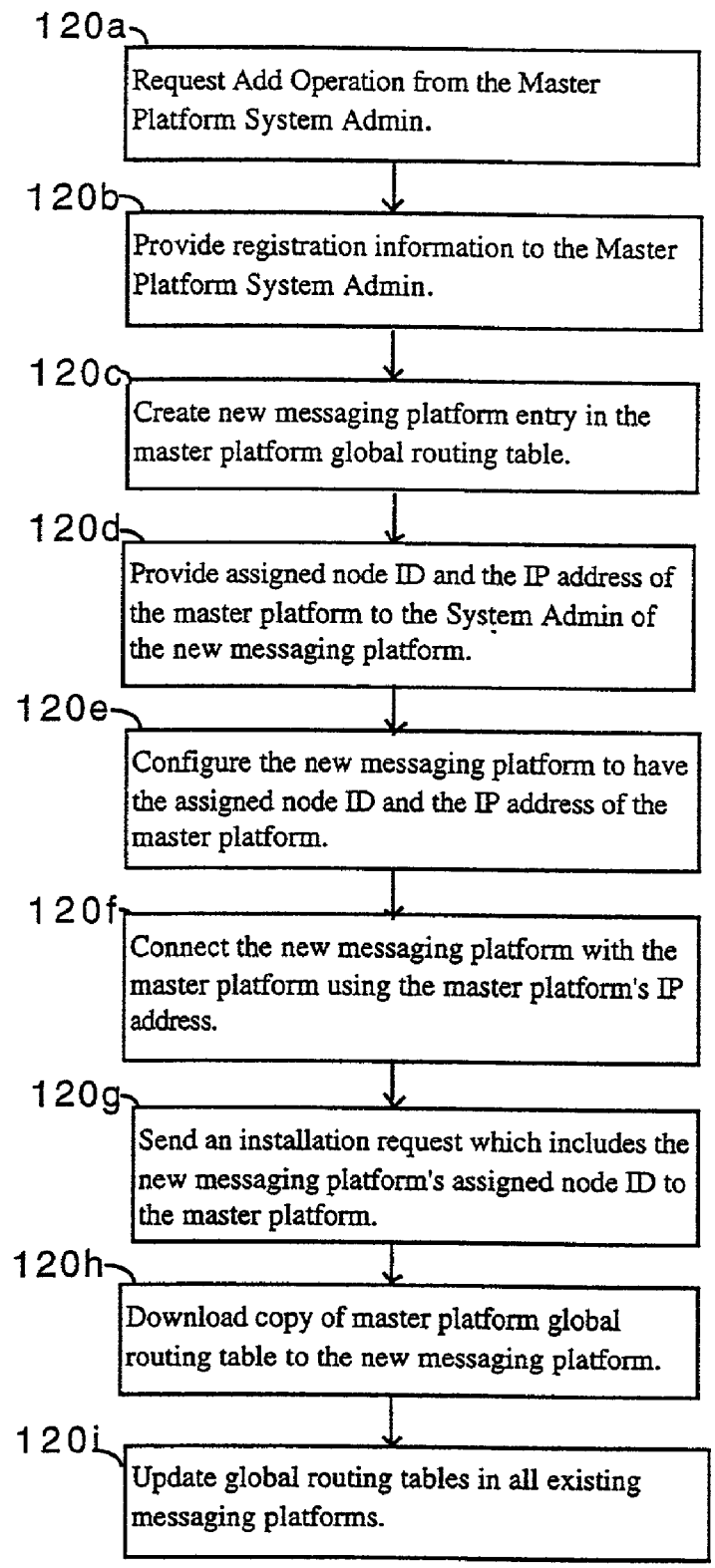
FIG. 3 is a block diagram showing the addition of a messaging platform to the messaging network in accordance with a preferred embodiment of the present invention.

FIG. 3 is a process chart showing the addition of a messaging platform to the messaging network in accordance with a preferred embodiment of the present invention.

Referring to FIGS. 1–3, at step 120*a* the addition of a new messaging platform 122 on messaging network 10 begins by requesting an add operation from a system administrator 124 of master platform 70. At step 120*b*, the add operation includes a registration process that requires system administrator 124 to receive registration information 126 pertaining to new messaging platform 122. Registration information 126 includes a preferred name 128, a permanent IP address 130 or an indication 132 whether new messaging platform 122 will have a dynamically assigned IP address, a domain name 134 (if any), and an initial token amount 136 to fill token pool 89.

Initial token amount 136 may vary among new messaging platforms added to messaging network 10 according to the amount sought by the owner of each new messaging platform. Initial token amount 136 held by a messaging platform at any given time may be replenished through a master platform upon request, as will be described in detail below.

As additional sub-steps to step 120*b*, a local network routing table 138 and/or an operation schedule 140 may also be provided to system administrator 124.

At step 120*c*, system administrator 124 creates a new messaging platform entry 142 corresponding to new messaging platform 122 in master global routing table 72. New messaging platform entry 142 includes registration information 126 and a unique node ID 144.

As an additional sub-step in step 120*c*, a name recording file 146 may also be created by system administrator 124 and included with new messaging platform entry 142 in master global routing table 72, if the new messaging platform is intended for connection to a telephone network such as telephone network 26.

At step 120*d*, once new message platform entry 142 has been created on master global routing table 72, a system administrator 148 for new messaging platform 122 is provided configuration information 150 which includes assigned node ID 144 and an IP address 152 of master platform 70. Configuration information 150 may also include a password 154 that master platform 70 will recognize as unique to new messaging platform 122.

At step 120e, system administrator 148 configures new messaging platform 122 to have configuration information 150.

At step 120f, in response to entering configuration information 150, new messaging platform 122 establishes a connection with master platform 70 using master platform IP address 152, enabling master platform 70 to respond by providing new messaging platform 122 with applicable information.

More specifically at step 120g, new messaging platform 122 sends an installation request 156 which includes node ID 144, and a password 154 if implemented, to master platform 70. Master platform 70 will recognize node ID 144 as pertaining to new messaging platform 122 based on corresponding messaging platform entry 142 in master global routing table 72 and performs step 120h.

At step 120h, master platform 70 downloads a copy of master global routing table 72 to new messaging platform 122.

At step 120i, global routing tables 74 and 76 for messaging platforms 16 and 20 on messaging network 10 are updated by master platform 70 to include a messaging entry corresponding to new messaging platform 122. Master platform 70 sends an UPDATE message to messaging platforms 16 and 20 which trigger messaging platforms 16 and 20 to include the new messaging platform entry in their global routing tables 74 and 76, respectively.

Monitoring Messaging Platforms

Figure 4:
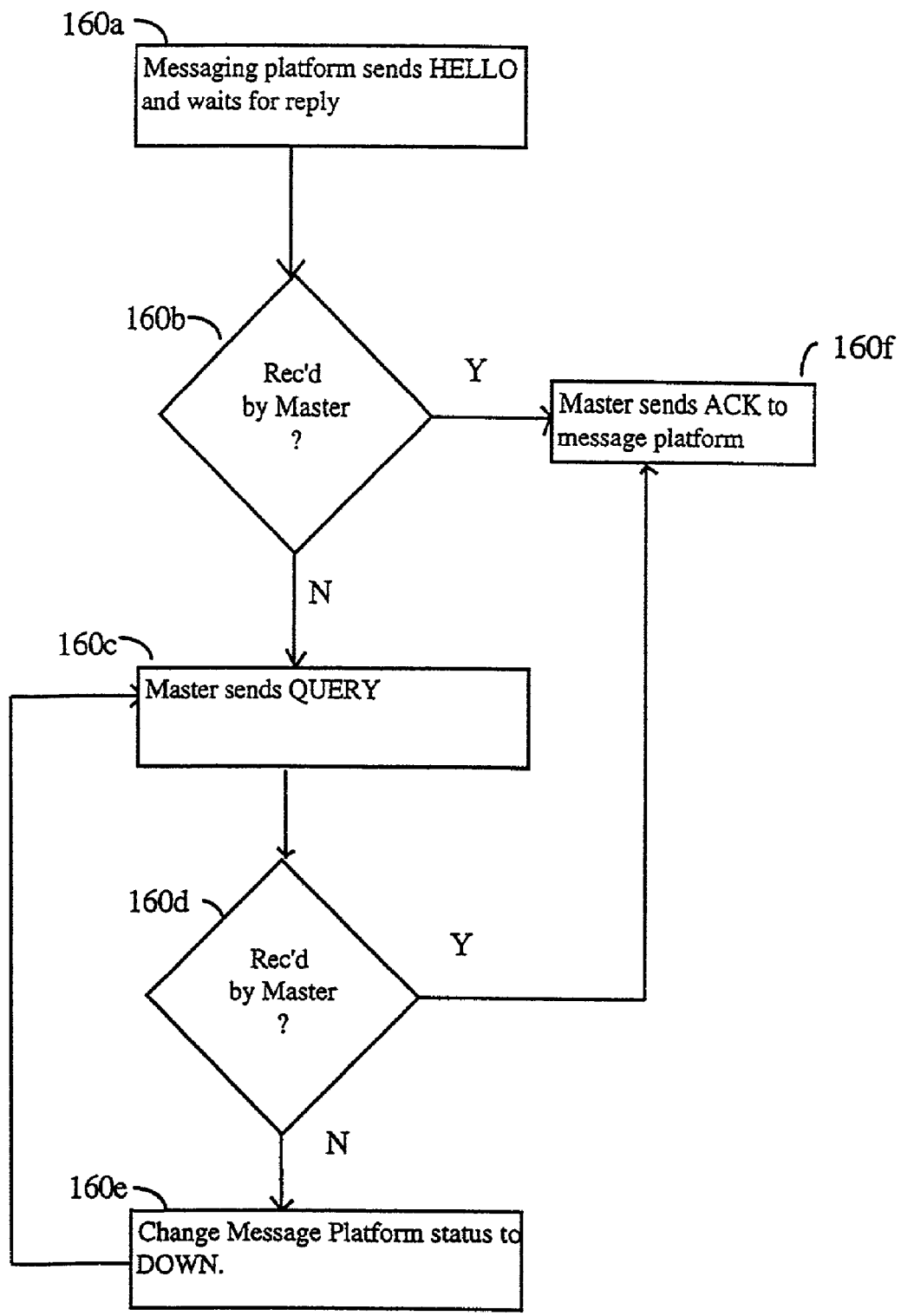
FIG. 4 is a flow chart of the steps taken by a master platform when monitoring messaging platforms on the messaging network in accordance with a preferred embodiment of the present invention.

FIG. 4 is a flow chart of the steps taken by a master platform when monitoring messaging platforms on the messaging network in accordance with a preferred embodiment of the present invention.

Through a microprocessor system running under program control or an equivalent device, a master platform monitors its assigned messaging platforms and updates its master global routing table in response to the monitoring function.

At step 160a, a messaging platform sends a HELLO message to its assigned master platform at selected intervals over a given time schedule. For a messaging platform having a dedicated connection, the selected intervals may be at any selected interval such as every half-hour on the half-hour, 24 hours each day. This selected interval of 30 minutes may be varied and is not intended to limit the present invention in anyway. For a messaging platform having a dial-up connection to the switched backbone, the messaging platform only sends HELLO messages while having a messaging network connection and during the operation schedule defined by the messaging platform's daily and hourly operation periods.

As presently contemplated, a HELLO message includes a command type, node ID, and password (if applicable) that corresponds to the sending messaging platform. The HELLO message may also include additional information pertaining to the messaging platform such as its current token pool balance.

At step 160b, if the HELLO message from the messaging platform is not received by its assigned master platform within an amount of time of the scheduled time (selected wait time) to receive the HELLO message, step 160c is performed.

At step 160c, the master platform will send a QUERY message to the late messaging platform. It is presently contemplated that the selected wait time be no more than ten (10) minutes beyond the scheduled time to receive a HELLO message.

A QUERY message includes a command type, a node ID, and password (if applicable) that corresponds to the sending messaging platform.

At step 160d, if the late messaging platform does not respond within the selected wait time, step 160e is performed. At step 160e, the master platform changes the status of the non-responding messaging platform to a non-operational status and alerts the master platform system administrator of the non-operational status of the non-responding messaging platform. In addition, the master platform returns to step 160c and sends another QUERY message to the late messaging platform with a selected wait time.

If at step 160b, the assigned master platform receives a HELLO message from the messaging platform within the selected wait time, step 100f is performed. At step 100f, the assigned master platform replies with an acknowledge message (ACK).

Figure 5:
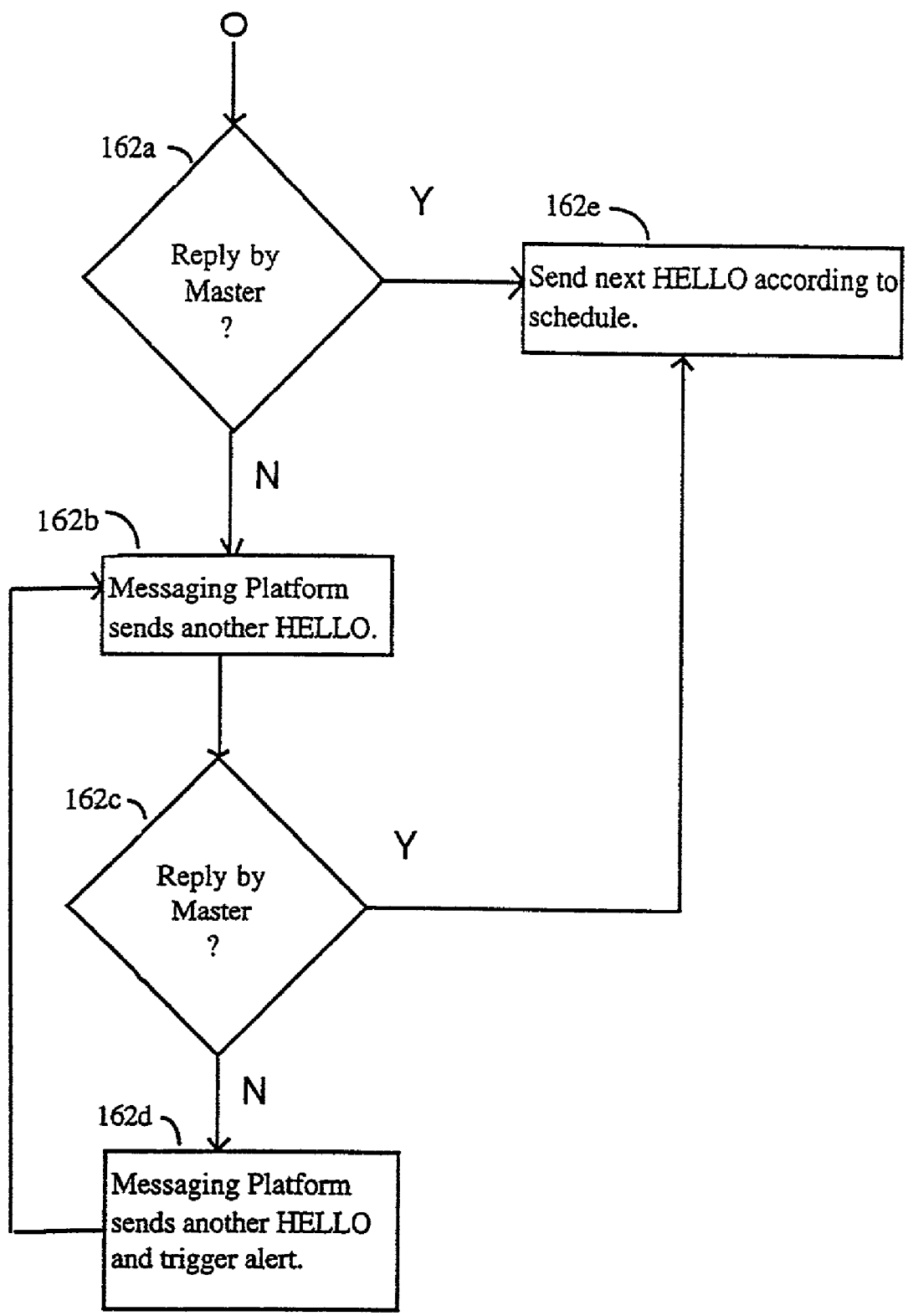
FIG. 5 is a flow chart of the steps taken by a messaging platform as part of the monitoring of the network by a master platform in accordance with a preferred embodiment of the present invention.

FIG. 5 is a flow chart of the steps taken by a messaging platform as part of the monitoring of the network by a master platform in accordance with a preferred embodiment of the present invention.

At step 162a, if the HELLO message, which was sent by the messaging platform, is not responded to with an ACK message by the messaging platform's assigned master platform within a selected wait time, step 162b is performed.

At step 162b, the messaging platform sends another HELLO message. It is presently contemplated that the particular messaging platform has a selected wait time of 10 minutes before sending another HELLO message. The amount of wait time is not considered to be limiting in anyway but may be varied to response to the processing loads incurred by a given master and messaging platform so as to optimize system performance.

At step 162c, if the assigned master platform does not respond to the second HELLO message, step 162d is performed. At step 162d, the messaging platform may keep sending a HELLO message each time the wait time expires by returning to set 162b. The messaging platform in step 162d may also send an alert message to the particular messaging platform's system administrator.

Returning to step 162a, if the HELLO message is responded to with an ACK by the master platform within a selected wait time, step 162e is performed. At step 162e, the messaging platform sends another HELLO message to the master platform according to a schedule defined for the messaging platform.

Similarly in step 162c, if the assigned master platform does respond to the second HELLO message within a selected wait time, step 160e is performed so that the messaging platform sends another HELLO message according to a schedule defined for the messaging platform.

Activating/Deactivating a Messaging Platform

Figure 6A:
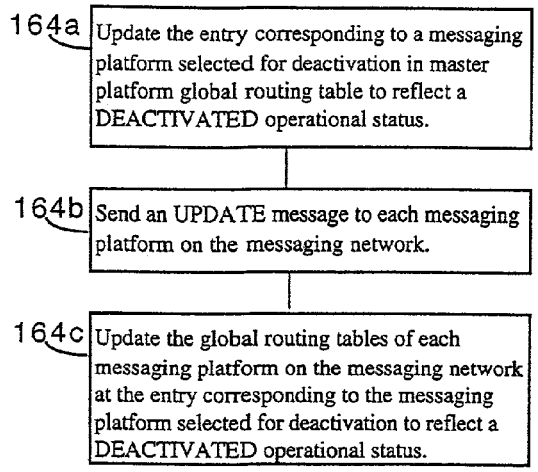
FIG. 6A is a block diagram showing the deactivation of a messaging platform in accordance with a preferred embodiment of the present invention.

FIG. 6A is a block diagram showing the deactivation of a messaging platform in accordance with a preferred embodiment of the present invention.

Referring to FIGS. 1 and 6A, in the event that a messaging platform such as messaging platform 16 has a non-operational status for any significant amount of time, such as one hour, master platform administrator 124 can choose to deactivate messaging platform 16 from messaging network 10.

Deactivation includes the following steps. At step 164a, master platform 70, which may be under software program control or equivalent means, is directed by master platform administrator 124 to update the entry corresponding to messaging platform 16 in master global routing table 72 to reflect a DEACIIVATED operational status.

At step 164*b*, master platform 70 sends an UPDATE message to each of its assigned messaging platforms on messaging network 10. The UPDATE message includes the entry corresponding to messaging platform 16 that reflects an DEACTIVATED operational status in master global routing table 72.

In an alternative embodiment of the present invention, through a microprocessor system running under program control or an equivalent device, master platform 70 may be configured to update automatically the entry corresponding to messaging platform 16 in master global routing table 72 to reflect a DEACTIVATED operational status when messaging platform does not respond as described above. This helps minimize the need for any intervening action by master platform administrator 124, if desired.

At step 164*c*, upon receiving the UPDATE message, each messaging platform updates their global routing tables at the entry corresponding to messaging platform 16 to reflect a DEACTIVATED operational status.

Figure 6B:
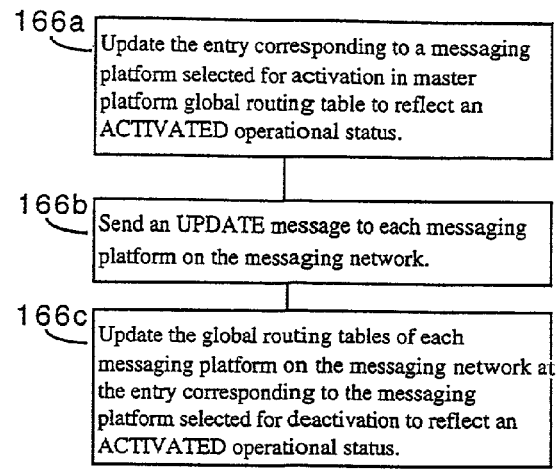
FIG. 6B is a block diagram showing the activation of a messaging platform in accordance with a preferred embodiment of the present invention.

FIG. 6B is a block diagram showing the activation of a messaging platform in accordance with a preferred embodiment of the present invention.

Activating a messaging platform is similar to the steps outlined immediately above. At step 166*a*, master platform 70 updates the entry corresponding to messaging platform 16 in master global routing table 72 to reflect an in-operation status, as shown in FIG. 6B.

At step 166*b*, master platform 70 also sends an UPDATE message to each of its assigned messaging platforms on messaging network 10. The UPDATE message includes the entry corresponding to messaging platform 16 that reflects an in-operation status in master global routing table 72.

At step 166*c*, upon receiving the UPDATE message, each messaging platform updates their global routing tables at the entry corresponding to messaging platform 16 to reflect an in-operation status.

Deleting a Messaging Platform

Figure 6C:
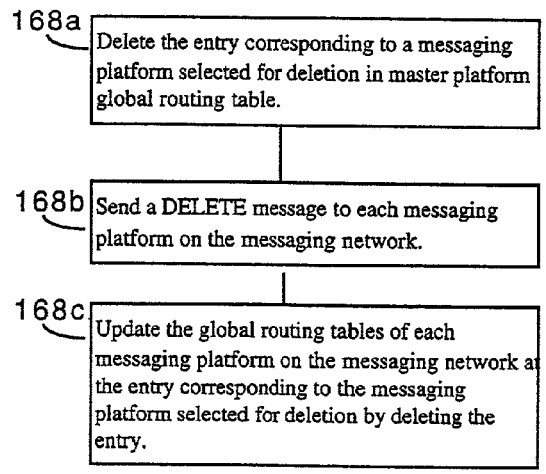
FIG. 6C is a block diagram showing the deletion of a messaging platform in accordance with a preferred embodiment of the present invention.

FIG. 6C is a block diagram showing the deletion of a messaging platform in accordance with a preferred embodiment of the present invention.

As shown in FIGS. 1 and 6C, deleting a messaging platform such as messaging platform 16 includes the following steps.

At step 168*a*, master platform 70 deletes the entry corresponding to messaging platform 16 from master global routing table 72.

At step 168*b*, the master platform updates the global routing tables of all messaging platforms that are to remain on the network (and which are assigned to the master platform) by sending a DELETE message to each of its assigned messaging platforms on messaging network 10.

As presently contemplated, a DELETE message includes at least one messaging platform entry that was deleted from master global routing table 72 by master platform 70. The messaging platform entry is used by messaging platforms to determine which entry in their global routing tables to delete.

At step 168*c*, each messaging platform updates their global routing tables by deleting the entry corresponding to messaging platform 16 using the messaging platform entry received from the DELETE message.

Tokens

Referring to FIG. 1, every network message delivery which includes using: 1) a switched network which forms the backbone for messaging network 10 such as switched backbone 18; 2) a network which imposes an outside use fee such as telephone network 22; and 3) a destination messaging platform such as messaging platform 16 used to complete the messaging transaction, will have a delivery cost. For example, an owner of destination messaging platform in San Francisco, Calif., may incur a telephone transmission charge for transmitting a fax originating from a messaging platform in Hong Kong, China to a recipient in San Jose, Calif. In order to minimize the complexity that would result if every independent owner of a messaging platform had to contract with every other independent owner of a messaging platform in order to deliver a message within a certain service area, the present invention imposes a cost for each network message delivery.

The cost for each network message delivery is measured in tokens. As described above, each messaging platform added to messaging network 10 begins with a token pool having an initial amount of tokens. Each owner of a messaging platform is charged for the cost of the tokens. Each time a network message delivery is initiated, the originating messaging platform debits a selected number of tokens from its token pool, while each time an inbound network message delivery occurs, a selected number of tokens are credited to the token pool held by a target messaging platform. Each messaging platform performs the debiting and crediting functions under software control or equivalent means.

Replenishing Tokens

If the entire token pool held by a messaging platform falls below a selected threshold amount such as when the token pool may soon be depleted or is depleted, the pool is replenished centrally by using its assigned master platform to provide additional tokens. Depletion of the entire pool of tokens for a given messaging platform ceases all network message deliveries by that messaging platform until its token pool is replenished. A microprocessor running under program control or equivalent device in the messaging platform determines whether it may request delivery of a user message via the messaging network. The token pool may be replenished by purchasing additional tokens through a request for replenishment to its assigned master platform or by gaining tokens from future inbound network message deliveries.

Upon a request for replenishment, the master platform sends an INFO message to the corresponding messaging platform which updates the token pool of that messaging platform. It is presently contemplated that an owner of a new messaging platform purchases an initial token pool amount at the time the new messaging platform is added to the network. Additional tokens may then be purchased for replenishing any depleted amounts.

As presently contemplated, an INFO message includes a command type and the node ID and password (if applicable) of the sending messaging platform. For example, the INFO message command type may include a token update command and a value for specifying a replenishment amount. The receiving messaging platform interprets an INFO message having a command type of token update by updating its token pool by the value specified in the command type.

Master Platform Post Office Feature

The present invention may also include a post office function for handling a message that is intended for a message platform that is in a non-operational state (target messaging platform) such as a messaging platform having a dial-up connection that is not within its operation schedule. The message is routed to a master platform which stores the message. The master platform delivers the message to the target messaging platform when the master platform determines that the target messaging platform has an in-operation status.

Figure 7:
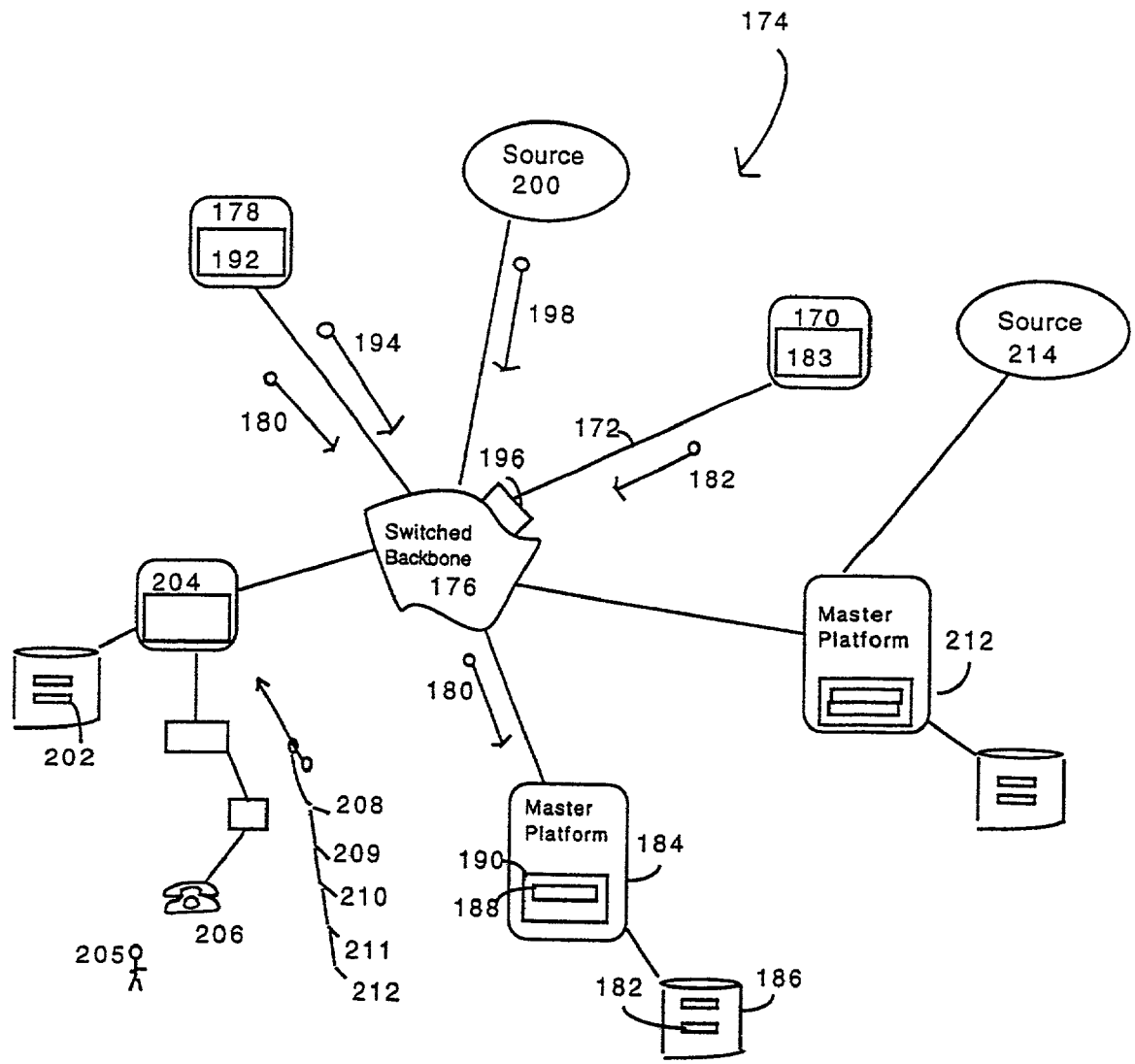
FIG. 7 is a schematic block diagram of a messaging management system having a post office feature in accordance with a preferred embodiment of the present invention.

For example, referring to FIG. 7, a messaging platform such as messaging platform 170 may have a dial-up connection 172 to messaging network 174 via its switched backbone such as the Internet 176. Since dial-up connection 172 may not be continuous, messages sent between messaging platform 170 and Internet 176 may be delayed. For example, messaging platform 178 may send a delivery-confirmed status message 180 to messaging platform 170 to confirm delivery of a user message 182 sent from messaging platform 170. If messaging platform 170 has a disconnected dial-up connection 172, delivery-confirmed confirming status message 180 will not arrive until dial-up connection 172 is reestablished, which would be attempted during the operational period defined for messaging platform 170. Also, messaging platform 178 will not receive a confining message from messaging platform 170 that delivery-confirmed status message 180 has been received until dial-up connection 172 has been established. Consequently, a status message intended for a messaging platform having a non-operational status at the time of delivery is instead routed to master platform 184 by the messaging platform that was requested to deliver a user message to a local area such as messaging platform 178.

Messaging platform 178 determines whether messaging platform 170 can receive the delivery-confirmed status message 180 by referring to global routing table 192. If the messaging platform entry in global routing table 192 indicates the inability of messaging platform 170 to receive delivery-confirmed status message 180, messaging platform 178 routes delivery-confirmed status message 180 to master platform 184. The inability to receive status messages may be indicated, for example, by an operation schedule that shows a messaging platform is not within its operation window such as its daily and/or hourly operation period.

When master platform 184 receives confirming message 180 from messaging platform 178, it stores confirming message 180 in a memory store location 186 corresponding to messaging platform 170 (mailbox slot) and tags confirming message 180 for delivery the next time messaging platform 170 is scheduled to re-connect. Master platform 184 determines the appropriate time to deliver the reply message by referencing messaging platform entry 188 corresponding to messaging platform 170 in master global routing table 190.

Unlike a messaging platform having a dial-up connection or a connection that has been interrupted, a messaging platform having a dedicated connection receives status messages directly from the replying messaging platform such as messaging platform 178 in FIG. 7. Replying messaging platform 178 distinguishes between messaging platforms having a dedicated or dial-up connections by referencing global routing table 192.

As an alternative embodiment, a status message 194 may be sent directly by messaging platform 178 to the messaging platform 170 as an email. However, if dial-up connection 172 has not yet been reestablished, status message 194 will not be delivered to messaging platform 170 but will be held by the service provider 196 until dial-up connection 172 is re-established. Unlike in the first embodiment, this approach does not specifically provide for a confirmation of receipt by messaging platform 170 since service provider 196 may not provide a confirmation of receipt of status message 194 by messaging platform 170 once dial-up connection 172 has been re-established.

Information Delivery

Figure 8:
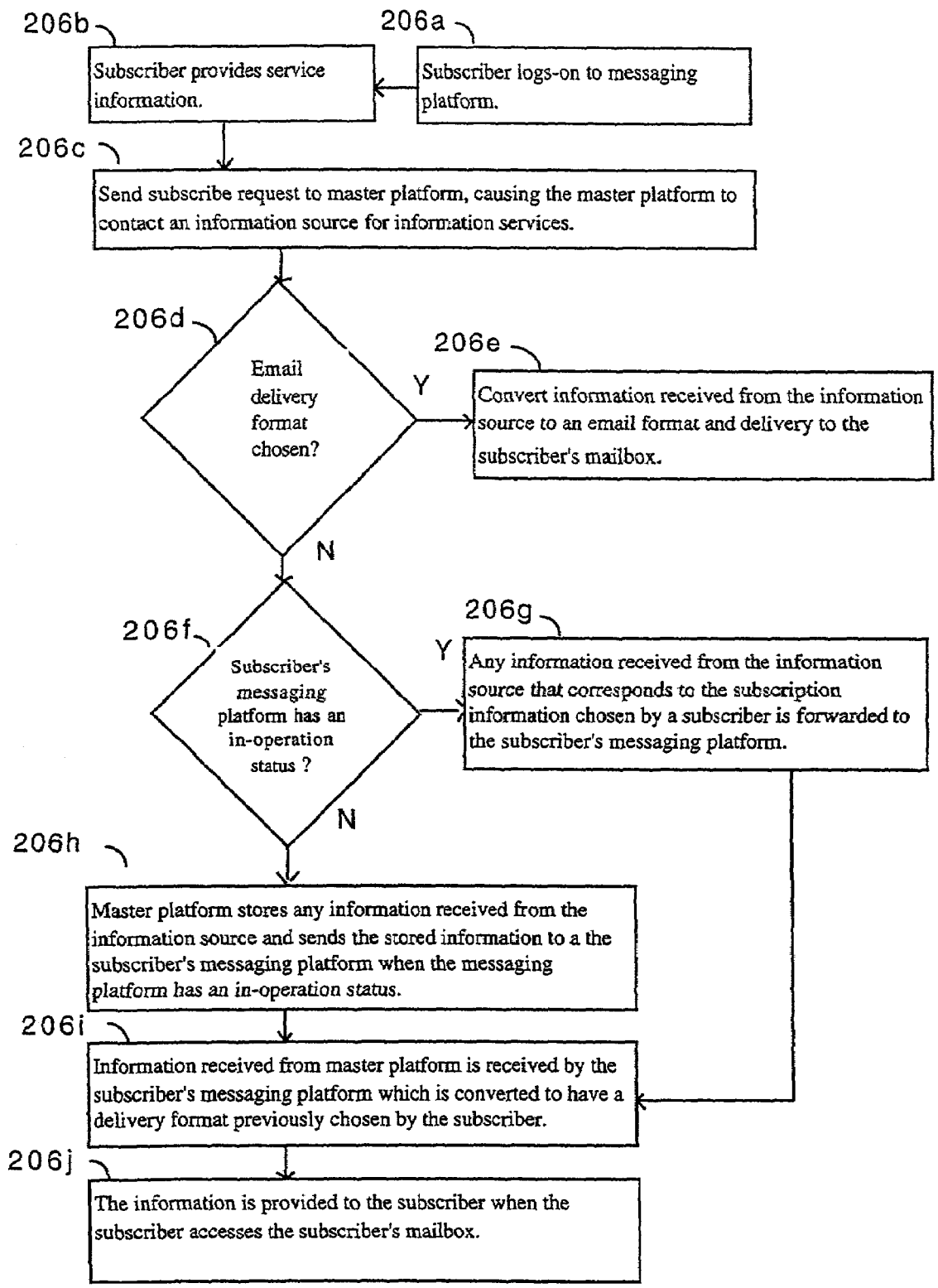
FIG. 8 is a block diagram showing the delivery of information from an information source to a mailbox corresponding to a subscriber in accordance with a preferred embodiment of the present invention.

Referring to FIGS. 7 and 8, the above described post office feature may be enhanced to include delivering information 198 from at least one information source 200 outside of messaging network 174 to a mailbox 202 provided by messaging platform 204. Messaging platform 204 has been configured to provide mailbox 202 which corresponds to a subscriber 205.

At step 206a, subscriber 205 logs on to messaging platform 204 to subscribe to an information delivery service provided by the messaging network. Logging on to messaging platform 204 may be accomplished through a telephone 206 since messaging platform 204 is configured to provide a telephone interface capable of interpreting subscriber-entered information made through a DTMF generator such as through a telephone keypad. To ensure proper information delivery, subscriber 205 is prompted for a mail box ID and/or password for identification purposes.

At step 206b, subscriber 205 provides service information 208 by selecting an information type 209, a delivery period 210 that defines how often information type 208 is to be delivered, and a delivery format 211. Service information 208 is provided through a service menu that is presented to subscriber 205 by messaging platform 204. The service menu provides a list of available services that messaging platform 204 has been configured to provide to its supported users. One of the services listed may include the information delivery service discussed herein. The service menu may also include additional services that are discussed in the present invention as well as services discussed in the multimedia messaging invention, which is incorporated herein by reference. Once the information delivery service is chosen, subscriber 205 is presented with a sub-menu that lists the information types that the messaging network has been configured to provide under that service.

For example, the sub-menu lists information types such as stocks, sports, and weather that may be selected by subscriber 205 through a telephone keypad (or equivalent DTMF generator). The button depressed reflects the position of the information type selected in the sub-menu, i.e., depressing a "1" chooses an information type of stocks, while depressing a "2" chooses an information type of sports. For an information type of stocks, messaging platform 204 also prompts subscriber 205 to enter a stock symbol using the telephone keypad in the manner outlined in the multimedia messaging invention, which is incorporated herein by reference.

Besides providing an information type 209 selection, subscriber 205 is also prompted for a delivery period 210, and delivery format 211 which are entered using the telephone keypad. In accordance with a present embodiment of the present invention, delivery format 211 includes an email, fax, or voice format.

At step 206c, after step 206b is complete, messaging platform 204 contacts its assigned master platform such as master platform 184 by sending a SUBSCRIBE request to master platform 184. In response, master platform 184 requests service from information source 200 by providing service information 208 received from subscriber 205. In addition, master platform 184 creates a storage location that corresponds to subscriber 205 in a memory store 186 for holding any information received from information source 200 that matches service information 208 entered by subscriber 205 in step 206*b*.

The SUBSCRIBE request includes a command type, a node ID corresponding to messaging platform 204, a mailbox ID corresponding to subscriber 205, and a password (if applicable). For example, the subscribe request may include a command type that instructs master platform 184 to request that information source 200 provide the information sought in service information 208 that was chosen by subscriber 205 in step 206*b*.

At step 206*d*, if service information 208 includes an email delivery format 211, step 206*e* is performed. Otherwise step 206*f* is performed. At step 206*e*, messaging platform converts any information received from information source 200 that corresponds to service information 208 entered by subscriber 205 into a message having an email format and delivers the message to mailbox 204 which corresponds to subscriber 205.

At step 206*f*, if subscribing messaging platform 204 has an in-operation status, such as when it has a viable connection to the switched backbone 176, step 206*g* is performed. At step 206*g*, any information received from source 200 that corresponds to the subscription information requested is forwarded to messaging platform 204 by master platform 184.

If at step 206*f*, subscribing messaging platform 204 has a non-operational status, step 206*h* is performed. Through a microprocessor system running under program control or equivalent device master platform performs the following steps. At step 206*h*, master platform stores any information received from source 200 in memory store 186. Master platform 184 does not send the stored information to a corresponding subscriber's messaging platform 204 until master platform 184 determines that messaging platform 204 has an in-operation status. For example, master platform 184 may refer to its master global routing table to find a messaging platform entry that defines the profile for messaging platform 204 to determine whether messaging platform 204 has an in-operation status based on the operation schedule listed in messaging platform entry.

In an alternative embodiment, the present invention may use a master platform 212 dedicated solely for the handling messages originating from information sources outside the messaging network such as from information source 214. Master platform 212 may be configured to receive information through any of its network interfaces such as through its switched backbone interface 176 or through an interface supporting a dedicated connection to information source 214.

At step 206*i*, the information received by master platform 184 is received by messaging platform 204 which converts the information to have delivery format 210 prior to delivery.

At step 206*j*, messaging platform 204 delivers the information to mailbox 202, which corresponds to subscriber 205, using delivery format 210.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A method for maintaining a messaging network having a master platform and at least one messaging platform, the master platform having a master global routing table and the at least one messaging platform having a global routing table, the master global routing table and the at least one messaging platform global routing table holding a messaging platform entry for a plurality of messaging platforms on the messaging network, the method comprising the steps of:

responding to each of the plurality of messaging platforms on the messaging network that sends a response message to the master platform, said response message sent by each of the plurality of messaging platforms at a selected interval which is defined in the messaging platform entry corresponding to each of the plurality of messaging platforms;

sending a query message to a selected one of the plurality of messaging platforms on the messaging network that fails to send a response message to the master platform within said selected interval;

updating a messaging platform entry of said selected messaging platform in the master global routing table and the global routing table of the at least one messaging platform on the messaging network, if said selected messaging platform fails to respond to said query message, said step of updating setting an operational status within said messaging platform entry to indicate a disabled status; and using said operational status of a remote messaging platform to determine whether the at least one messaging platform may send a user message using the messaging network to said remote messaging platform for delivery to an area of operation supported by said remote messaging platform.

2. The method of claim 1, further including the steps of:

providing a token pool of said messaging platform entry for each of said plurality of messaging platforms with an initial amount of tokens;

debiting a debit amount from the token pool of a messaging platform that requests delivery of a user message at an area of operation supported by a remote messaging platform; and incrementing a credit amount to the token pool of said remote messaging platform in response to the delivery of said user message within said area of operation by said remote messaging platform.

3. The method of claim 2, further including a step of updating a messaging platform entry of a messaging platform to have a disabled operation status in response to said messaging platform having a token pool amount that falls below a selected threshold.

4. A system for maintaining a messaging network having at least one messaging platform, the system comprising:

a master platform having a master global routing table configurable to store a messaging platform entry for each messaging platform on the messaging network;

a global routing table for at least one messaging platform, wherein said global routing table holds a messaging platform entry for each messaging platform on the messaging network;

wherein said master platform is configured to respond to each messaging platform on the messaging network that sends a response message to said master platform, said response message sent by each messaging platform at a selected interval which is defined in the messaging platform entry corresponding to each messaging platform;

wherein said master platform is further configured to send a query message to a selected messaging platform on the messaging network that fails to send a response message to the master platform within said selected interval;

wherein said master platform is further configured to update an operational status of said selected messaging platform entry to a disabled status, said messaging platform entry corresponding to said selected messaging platform in said master global routing table and said global routing table of said at least one messaging platform on the messaging network, if said selected messaging platform fails to respond to said query message; and wherein a sending messaging platform on the network is configured to check said operational status of a remote messaging platform to determine whether said sending messaging platform may send a user message using the messaging network to said remote messaging platform for delivery to an area of operation supported by said remote messaging platform.

5. The system of claim 4, wherein said messaging platform entry comprises a token pool for each messaging platform, said token pool of each messaging platform having an initial amount of tokens; said master platform being configurable to debit a debit amount from a token pool of an originating messaging platform that requests delivery of a user message at an area of operation supported by a remote messaging platform; and said master platform increments a credit amount to a token pool of said remote messaging platform in response to the delivery of said user message within said area of operation by said remote messaging platform.

6. The system of claim 5, wherein said master platform updates a messaging platform profile of a messaging platform to have a disabled operation status in response to said messaging platform having a token pool amount that falls below a selected threshold.

7. A system for maintaining a messaging network having a plurality of messaging devices, comprising:

a master device having a master global routing data structure with a messaging device data entry for at least one of the plurality of messaging devices on the messaging network, each messaging device data entry including an operational status;

wherein the master device is capable of responding to each messaging device on the messaging network that sends a first message type within a predetermined interval;

wherein the master device is capable of sending a second message type to the at least one of the plurality of messaging devices on the messaging network that fails to send the first message type to the master device within the predetermined interval; and wherein the master device is further capable of altering the operational status of the messaging device entry of the at least one messaging device to a disabled status if the at least one messaging device fails to respond to the second message type.

8. The system of claim 7 wherein the predetermined interval is defined in the messaging device data entry for the at least one of the plurality of messaging devices.

9. The system of claim 7 wherein a first messaging device on the network is configured to check the operational status of the at least one of the plurality of messaging devices to determine whether the first messaging device may send a user message using the messaging network to the at least one of the plurality of messaging devices.

10. The system of claim 7, further comprising an operational area data entry for the at least one of the plurality of messaging devices in the master global routing data structure.

11. The system of claim 10 wherein a first messaging device on the network is configured to check the operational area of the at least one of the plurality of messaging devices to determine whether the first messaging device may send a user message using the messaging network to the at least one of the plurality of messaging devices for to delivery to an area of operation supported by the at least one of the plurality of messaging devices.

12. The system of claim 7, further comprising a global routing data structure associated with each of the plurality of messaging devices, the global routing data structure having a messaging device data entry for each of the plurality of messaging devices on the messaging network, each messaging device data entry comprising a host ID, and an operational status.

13. The system of claim 12 wherein the master device is further configured to update the operational status of messaging device data entries of the global routing data structure associated with each of the plurality of messaging devices.

14. The system of claim 13 wherein the master device alters the operational status of a messaging device data entry for a predetermined one of the plurality of messaging devices in the global routing data structure associated with each of the plurality of messaging devices to a disabled status if the predetermined messaging device fails to respond to the second message type.

15. The system of claim 7 wherein each of the plurality of messaging devices has an initial amount of tokens in a token pool associated with the respective messaging device, the master device being further configured to debit a debit amount of tokens from the token pool of a first messaging device that requests delivery of a user message at an area of operation supported by a second messaging device and to add a credit amount of tokens to the token pool of the second messaging device in response to the delivery of the user message within the area of operation by the second messaging device.

16. The system of claim 15 wherein the master device updates a messaging device profile of a predetermined one of the plurality of messaging devices to have a disabled operation status in response to the predetermined messaging device having a token pool amount that falls below a predetermined threshold.

17. A method for providing information to a subscriber having a mailbox and a corresponding mailbox ID on a messaging system, the method comprising the steps of:

providing service information to a messaging platform;

sending a request for information to a master platform in response to the service information, the master platform responding to the request by requesting information from an information source, the information corresponding to the service information;

receiving the requested information from the information source;

converting the received information a delivery format specified in the service information; and providing the requested information to the subscriber in the specified delivery format.

18. The method in claim 17 wherein the delivery format includes a fax delivery format.

19. The method in claim 17 wherein the delivery format includes a voice delivery format.

20. The method in claim 17 wherein the delivery format includes an email format.

21. The method of claim 17 wherein the master platform forwards the received information to the messaging platform only when the messaging platform has an in-operation status.

22. The method of claim 21 wherein the in-operation status is at least partly based on an operation schedule defined for the messaging platform.

23. A method for providing information to a subscriber on a messaging system, the method comprising the steps of:
   receiving a mailbox ID and service information from a subscriber;
   requesting information from an information source based on the received service information;
   receiving the requested information from the information source;
   converting the received information to a delivery format specified in the received service information if the requested information from the information source is received in a format other then the specified delivery format; and
   delivering the requested information to a computing device of the subscriber in the specified delivery format.

24. The method in claim 23 wherein the delivery format includes a fax delivery format.

25. The method in claim 23 wherein the delivery format includes a voice delivery format.

26. The method in claim 23 wherein the delivery format includes an email format.

27. The method of claim 23 wherein the received information is forwarded to a messaging platform to which the subscriber computing device is coupled only when the messaging platform has an in-operation status.

28. The method of claim 27 wherein the in-operation status is at least partly based on an operation schedule defined for the messaging platform.

29. A system for delivering information to a subscriber computing device on a messaging system, the system comprising:
   a messaging computer having a communication module configured to receive a mailbox ID and service information from the subscriber computing device and to request information corresponding to the service information;
   the communication module being further configured to communicate with an information source in response to the request for information and to transmit the request for information thereto;
   wherein the messaging computer is further configured to respond to any information received from the information source by converting the received information to have a delivery format corresponding to a delivery format specified in the service information; and
   wherein the messaging computer communication module is further configured to provide the received information in the specified delivery format to the subscriber computing device when the subscriber accesses a mailbox corresponding to the mailbox ID.

30. The system in claim 29 wherein the service information includes an information type and a delivery period.

31. The system in claim 29 wherein the delivery format includes a voice delivery format.

32. The system in claim 29 wherein the delivery format includes an email format.

33. The system in claim 29 wherein the delivery format includes a fax format.

34. The system of claim 29 wherein the messaging computer communication module forwards the received information to the subscriber computing device only when the subscriber computing device has an in-operation status.

35. The system of claim 34 wherein the in-operation status is based on an operation schedule defined for the subscriber computing device.

36. The system of claim 29 wherein the messaging computer is configured to delay sending the received information to the subscriber computing device when the subscriber computing device has a non-operational status.

37. A messaging platform for delivering information to a subscriber on a messaging system, the system comprising:
   means for receiving a mailbox ID and service information from a subscriber;
   means for requesting from a master platform information corresponding to the service information,
   means for receiving the requested information from the master messaging platform in response to the master platform sending a request for information from an information source and receiving the requested information therefrom;
   means for converting the information received from the master messaging platform to have a delivery format corresponding to a delivery format selected by the subscriber; and
   means for providing the information in the subscriber-selected delivery format to the subscriber when in response to subscriber access of a mailbox corresponding to the mailbox ID.

38. The system of claim 37 wherein the information in the information source response message delivered to the subscriber is multimedia information.

39. The system in claim 37 wherein said service information includes an information type and a delivery period.

40. The system in claim 39 wherein the delivery format comprises a selected one of a voice delivery format, an email format, and a facsimile format.

41. A method for maintaining a messaging network having a master platform and a plurality of messaging platforms coupled to the master messaging platform, the method comprising:
   waiting for each of the plurality of messaging platforms to send a first message type to the master platform within a first predetermined time interval associated with each of the respective plurality of messaging platforms;
   sending an acknowledgement message to each of the plurality of messaging platforms from which the first message type was received within the respective first predetermined time intervals;
   indicating an enabled operational status for each of the plurality of messaging platforms from which the first message type was received within the respective first predetermined time intervals;
   if the first message type is not received from one of the plurality of messaging platforms within the respective first predetermined time interval, sending a second message type to the one of the plurality of messaging platforms;
   waiting for the one of the plurality of messaging platforms to respond to the second message type within a second predetermined time interval; and
   if a response to the second message type is not received from the one of the plurality of messaging platforms within the second predetermined time interval, indicating a disabled operational status for the one of the plurality of messaging platforms.

42. The method of claim 41, further comprising using the operational status to control delivery of messages to each of the plurality of messaging platforms wherein messages may be delivered to any of the messaging platforms whose operational status is enabled and messages may not be delivered to any of the messaging platforms whose operational status is disabled.

43. The method of claim 41, further comprising continuing to send the second message type to the one of the plurality of messaging platforms whose operational status is disabled.

44. The method of claim 43, further comprising altering the operational status to enabled for the one of the plurality of messaging platforms whose operational status is disabled if the one of the plurality of messaging platforms responds to the second message type.

* * * * *